(12) United States Patent
Walton et al.

(10) Patent No.: US 11,095,525 B2
(45) Date of Patent: Aug. 17, 2021

(54) DIAGRAMMING SYSTEM FOR A DISTRIBUTED DATA PROCESSING SYSTEM

(71) Applicant: International Business Machines Corporation, Armonk, NY (US)

(72) Inventors: Kaleb Walton, Byron, MI (US); Miguel Angel Beher Valdivia, Roswell, GA (US); George Bigwood, Livonia, MI (US); Aaron T. Wodrich, Buckeye, AZ (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 15/957,683

(22) Filed: Apr. 19, 2018

(65) Prior Publication Data

US 2019/0327151 A1 Oct. 24, 2019

(51) Int. Cl.
*H04L 12/24* (2006.01)
*H04L 9/12* (2006.01)
*G06F 30/18* (2020.01)

(52) U.S. Cl.
CPC ............ *H04L 41/145* (2013.01); *G06F 30/18* (2020.01); *H04L 9/12* (2013.01); *H04L 41/046* (2013.01); *H04L 41/0853* (2013.01); *H04L 41/28* (2013.01)

(58) Field of Classification Search
CPC ....... H04L 41/145; H04L 9/12; H04L 41/046; H04L 41/0853; H04L 41/28; H04L 67/10; H04N 21/2351
USPC .......................................... 703/2, 22, 24, 26
See application file for complete search history.

(56) References Cited

U.S. PATENT DOCUMENTS

| | | | | |
|---|---|---|---|---|
| 6,029,195 A * | 2/2000 | Herz | ...................... | G06Q 30/02 725/116 |
| 6,671,635 B1 * | 12/2003 | Forth | ..................... | G01R 35/04 324/74 |
| 7,043,716 B2 * | 5/2006 | Zimmer | ................... | G06F 8/30 715/234 |

(Continued)

OTHER PUBLICATIONS

De Sarka et al., "A Study on Performance Analysis Tools for Applications Running on Large Distributed Systems," Jun. 2010, 15 pages. https://arxiv.org/pdf/1006.2650.

(Continued)

*Primary Examiner* — Thai Q Phan
(74) *Attorney, Agent, or Firm* — Yee & Associates, P.C.

(57) ABSTRACT

A method, a system, and a computer program product for generating a representation of a distributed data processing system. A computer system instruments a set of elements in the distributed data processing system with a set of recorders. Encryption information is sent by the computer system to the set of recorders in the distributed data processing system, wherein the set of recorders uses the encryption information to decrypt traffic in the distributed data processing system. The computer system then sends a set of test cases into the distributed data processing system. The representation of the distributed data processing system is generated by the computer system using results from sending the set of test cases into the distributed data processing system, reducing a time for the computer system to generate the representation of the distributed data processing system.

20 Claims, 9 Drawing Sheets

(56) References Cited

U.S. PATENT DOCUMENTS

| | | | |
|---|---|---|---|
| 7,216,179 B2* | 5/2007 | Ott | H04L 29/06 |
| | | | 709/227 |
| 9,251,368 B2 | 2/2016 | Booth et al. | |
| 9,380,008 B2 | 6/2016 | Ramarao et al. | |
| 10,368,810 B2* | 8/2019 | Quinn | A61B 5/746 |
| 10,642,932 B2* | 5/2020 | Bogdan | G06F 16/285 |
| 2002/0150093 A1* | 10/2002 | Ott | H04L 45/00 |
| | | | 370/389 |
| 2007/0239892 A1* | 10/2007 | Ott | H04L 45/00 |
| | | | 709/242 |
| 2012/0054566 A1* | 3/2012 | Gupta | G11C 29/02 |
| | | | 714/723 |
| 2015/0073609 A1* | 3/2015 | Forbes, Jr. | H02J 13/0006 |
| | | | 700/286 |
| 2016/0071059 A1* | 3/2016 | Petering | G06Q 10/103 |
| | | | 705/301 |
| 2017/0195697 A1* | 7/2017 | Nair | H04N 21/23439 |
| 2017/0344045 A1* | 11/2017 | Forbes, Jr. | H02J 13/00028 |
| 2018/0059702 A1* | 3/2018 | Forbes, Jr. | G06Q 50/06 |
| 2018/0144378 A1* | 5/2018 | Perez | G06F 16/972 |
| 2018/0314612 A1* | 11/2018 | Shaikh | H04L 43/50 |
| 2019/0158469 A1* | 5/2019 | Gonzalez | H04W 12/088 |
| 2019/0354127 A1* | 11/2019 | Forbes, Jr. | H02J 3/14 |

OTHER PUBLICATIONS

Warman, "A Distributed System Testing Framework," Thesis, University of Victoria, Master of Applied Science, copyright 2008, 78 pages. http://dspace.library.unic.ca.8080/bitstream/1828/1338/1/uvicthesis.pdf.

Woo, "Authentication for Distributed Systems," Journal of Computers, vol. 25, Issue 1, Jan. 1992, pp. 39-52.

Anonymously, "Data-level access control in secure network environment," An IP.com Prior Art Database Technical Disclosure, May 15, 2017, 7 pages. http://ip.com/IPCOM/000249996D.

Anonymously, "System or methods to share customer encryption artifacts for the purpose of validating such artifacts without compromising the integrity and security of those artifacts," An IP.com Prior Art Database Technical Disclosure, Jul. 31, 2013, 5 pages. http://ip.com/IPCOM/000229481D.

* cited by examiner

DIAGRAMMING SYSTEM FOR A DISTRIBUTED DATA PROCESSING SYSTEM

BACKGROUND

1. Field

The disclosure relates generally to improve data processing systems and, more specifically, to a method, a system, and a computer program product for generating a representation of a distributed data processing system.

2. Description of the Related Art

Distributed data processing systems can be large and complex. For example, a distributed data processing system for a company may have thousands of server computers, client computers, client devices, routers, firewalls, virtual machines, storage systems, and other components. Learning the manner in which a distributed data processing system operates without a diagram is difficult. The diagram of the distributed data processing system may be used to identify a problem or locate different elements within the distributed data processing system.

Creating a diagram of a distributed data processing system is a complex and time-consuming process. For example, creating a diagram of the distributed data processing system may involve performing inventory of elements within the distributed data processing system. Further, identifying connections and data flows between these elements is also a time-consuming process. For example, a software engineer, information technology specialist, or other person performing actions on a history to distributed data processing systems needs to have an understanding of distributed data processing systems. Currently, a person may search for documentation which may be scarce. For example, an updated diagram may be present. This outdated diagram, however, may contain host names, routes, and applications that are no longer used or current in the distributed data processing system. The person may then test, search, scan, and analyze the distributed data processing system to update or create a new diagram for the distributed data processing system. This type of process may take weeks or months to obtain a diagram that is usable by the person needed for performing their tasks.

After the updated diagram is created for the distributed data processing system, changes may occur in the distributed data processing system over time. For example, servers may be added or removed; subnets may be created or removed; virtual machines may be added or reconfigured on servers; applications may be added, updated, or removed; and other changes may occur within a distributed data processing system over time.

As a result, without updates, the accuracy of a diagram of the distributed data processing system may fall quickly over time as changes are made to the distributed data processing system. Maintaining the accuracy of the diagram involves allocating personnel resources to update the diagram as changes are made. If the updates are not performed immediately, then the changes made to the distributed data processing system may be missed or omitted without accurate record keeping of these changes. These types of updates often do not have a priority within an information technology (IT) group. As a result, diagrams of distributed data processing systems often have a limited value in understanding the distributed data processing systems.

Therefore, it would be desirable to have a method and apparatus that take into account at least some of the issues discussed above, as well as other possible issues. For example, it would be desirable to have a method and apparatus that overcome a technical problem with efficiently generating a representation of a distributed data processing system.

SUMMARY

According to one embodiment of the present invention, a method for generating a representation of a distributed data processing system is presented. A computer system instruments a set of elements in the distributed data processing system with a set of recorders. Encryption information is sent by the computer system to the set of recorders in the distributed data processing system. The set of recorders uses the encryption information to decrypt traffic in the distributed data processing system. The computer system then sends a set of test cases into the distributed data processing system. The representation of the distributed data processing system is generated by the computer system using results from sending the set of test cases into the distributed data processing system, reducing a time for the computer system to generate the representation of the distributed data processing system.

According to another embodiment of the present invention, a diagramming system comprising a computer system and a representation manager running on the computer system is presented. The representation manager instruments a set of elements in the distributed data processing system with a set of recorders and sends encryption information to the set of recorders in the distributed data processing system. The set of recorders uses the encryption information to decrypt traffic in the distributed data processing system. The representation manager sends a set of test cases into the distributed data processing system and generates a representation of the distributed data processing system using results from sending the set of test cases into the distributed data processing system. The representation manager enables reducing a time for the computer system to generate the representation of the distributed data processing system.

According to yet another embodiment of the present invention, a computer program product for generating a representation of a distributed data processing system is presented. The computer program product comprises a computer-readable storage media; and first program code, second program code, third program code, and fourth program code which are stored on the computer-readable storage media. The first program code instruments a set of elements in the distributed data processing system with a set of recorders. The second program code sends encryption information to the set of recorders in the distributed data processing system. The set of recorders uses the encryption information to decrypt traffic in the distributed data processing system. The third program code sends a set of test cases into the distributed data processing system. The fourth program code generates the representation of the distributed data processing system using results from sending the set of test cases into the distributed data processing system, reducing a time for the computer system to generate the representation of the distributed data processing system.

DETAILED DESCRIPTION

Figure 1:
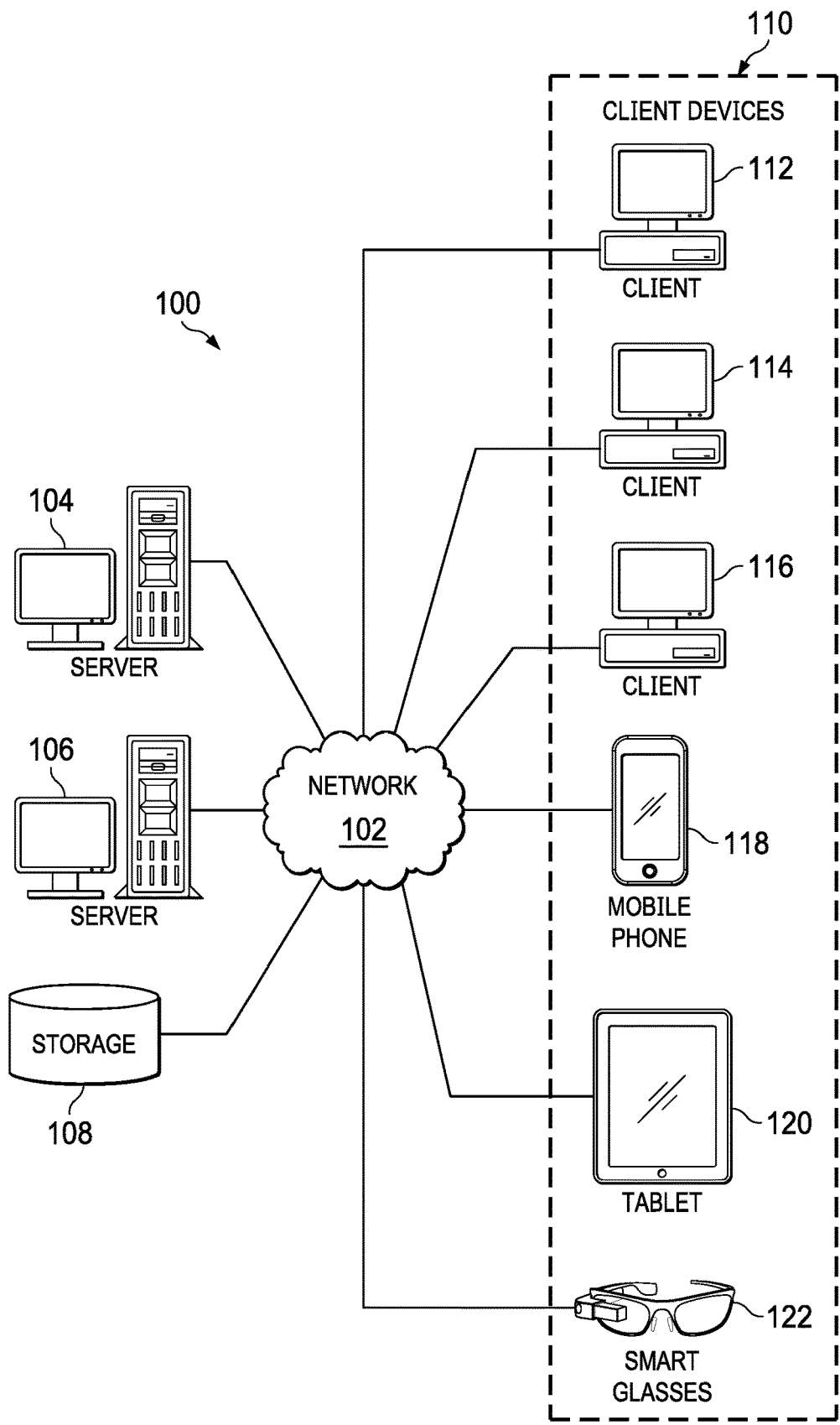
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account that it would be desirable to have a method, an apparatus, a computer system, and a computer program product generating a representation of a distributed data processing system in a manner that reduces the time and effort as compared to current techniques. In one illustrative example, a computer system instruments a set of elements in the distributed data processing system with a set of recorders. Encryption information is sent to the set of recorders in the distributed data processing system. A set of test cases is sent into the distributed data processing system. The representation of the distributed data processing system is generated using results from sending the set of test cases into the distributed data processing system, reducing a time for the computer system to generate the representation of the distributed data processing system.

With reference now to the figures and, in particular, with reference to FIG. 1, a pictorial representation of a network of data processing systems is depicted in which illustrative embodiments may be implemented. Distributed data processing system 100 is a network of computers in which the illustrative embodiments may be implemented. Distributed data processing system 100 contains network 102, which is the medium used to provide communications links between various devices and computers connected together within distributed data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, some or all of client devices 110 may form an Internet of things (IOT) in which these physical devices can connect and exchange data.

Client devices 110 are clients to server computer 104 in this example. Distributed data processing system 100 may include additional server computers, client computers, and other devices not shown. Client devices 110 connect to network 102 utilizing at least one of wired, optical fiber, or wireless connections.

Program code located in distributed data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, distributed data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
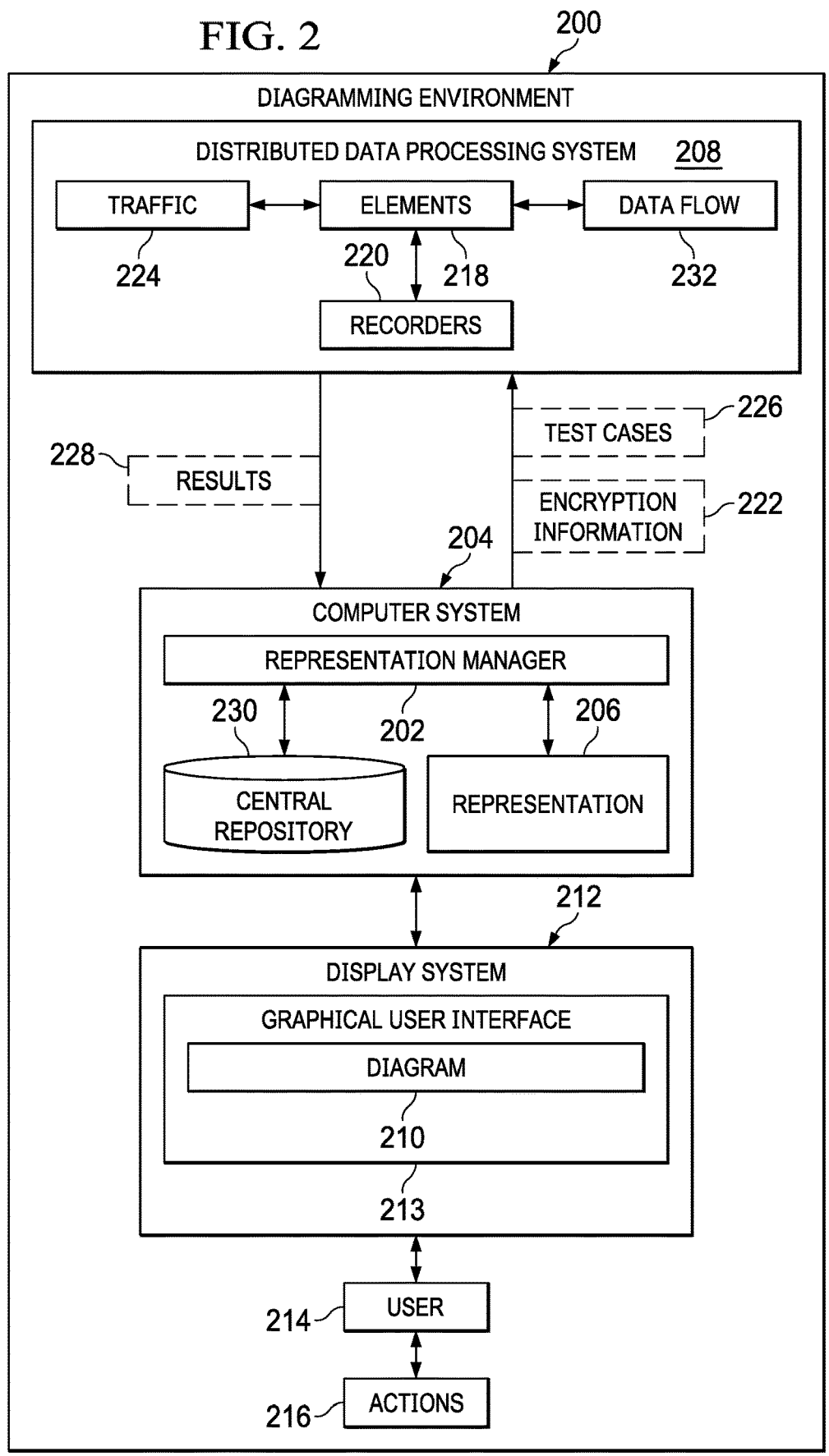
FIG. 2 is a block diagram of a diagramming environment in accordance with an illustrative embodiment.

With reference now to FIG. 2, a block diagram of a diagramming environment is depicted in accordance with an illustrative embodiment. In this figure, diagramming environment 200 includes components that can be implemented in hardware such as the hardware shown in distributed data processing system 100 in FIG. 1.

In this illustrative example, diagramming environment 200 includes representation manager 202 running on computer system 204. As depicted, representation manager 202 operates to generate representation 206 of distributed data processing system 208. The generation of representation 206 of distributed data processing system 208 by representation manager 202 may be performed automatically without needing user input.

Representation manager 202 also operates to display representation 206 as diagram 210 in graphical user interface 213 on display system 212 for computer system 204. In this illustrative example, display system 212 is a physical hardware system and includes one or more display devices on which graphical user interface 213 may be displayed. The display devices may include at least one of a light emitting diode (LED) display, a liquid crystal display (LCD), an organic light emitting diode (OLED) display, or some other suitable device on which graphical user interface 213 can be displayed.

The display of diagram 210 in graphical user interface 213 on display system 212 enables user 214 to visualize elements 218 within distributed data processing system 208 using diagram 210. In this illustrative example, elements 218 is at least one of hardware or software. For example, elements 218 may be selected from at least one of a hypervisor, a virtual machine, an operating system kernel, an application, a computer, a router, a domain name server, a router, a database management system, a disk drive, a mobile phone, a tablet computer, a server computer, a workstation, a switch, or other suitable types of hardware or software that can be utilized in distributed data processing system 208. In one illustrative example, representation manager 202 can display diagram 210 for representation 206 of distributed data processing system 208 in which diagram 210 includes annotations identifying elements 218 causing security risks 300. The annotations are graphical indicators to draw the attention of the viewer to the particular element or elements that are causing one or more of security risks 300.

This visualization of distributed data processing system 208 enables user 214 to perform a number of actions 216. The number of actions 216 is real-world actions that can affect distributed data processing system 208. The number of actions 216 may include, for example, at least one of scheduling a repair, identifying a problem, initiating a scan, changing a location of a computer, performing budget planning, updating an application on a server computer, planning updates, or other suitable types of actions to manage distributed data processing system 208.

In this illustrative example, representation manager 202 instruments a set of elements 218 in the distributed data processing system with a set of recorders 220. In other words, a portion of elements 218 for all of elements 218 may instrumented.

As depicted in this illustrative example, the instrumenting of a recorder in the set of recorders 220 to an element in the set of elements 218 means that code, hardware, or some combination thereof for the recorder may be added, connected to, or placed in communication with an element that allows the recorder to monitor some behavior of the element. In this illustrative example, the recorder can monitor traffic 224 for the element. For example, a network packet analyzer may be used to record and monitor traffic 224 for an element in the set of elements 218. In this example, traffic 224 can be at least one of input to the element or output from the element. In these illustrative examples, the set of elements 218 for monitoring is a portion of all of elements 218.

Representation manager 202 sends encryption information 222 to the set of recorders 220 in distributed data processing system 208. As used herein, "a set of," when used with respect to items, means one or more items. For example, "a set of elements 218" is one or more of elements 218, and "a set of recorders 220" is one or more of recorders 220.

The set of recorders 220 uses encryption information 222 to decrypt traffic 224 in distributed data processing system 208. In this illustrative example, encryption information 222 is selected from at least one of an encryption key, a decryption key, a symmetric key, a certificate, or some other suitable type of encryption information. With the ability to decrypt traffic 224, the set of recorders 220 is able to record traffic 224 from the set of elements 218 in a manner that can be more easily analyzed and provide additional information for generating representation 206. For example, the ability to decrypt encrypted information in traffic 224 can enable representation manager 202 to track the flow of particular pieces of information in test cases 226 in data flow 232 in distributed data processing system 208.

Representation manager 202 sends a set of test cases 226 into distributed data processing system 208. The set of recorders 220 records results 228 that occur from sending the set of test cases 226 into distributed data processing system 208. As depicted, the set of recorders 220 can record data including traffic 224 prior to the set of test cases 226 being sent into distributed data processing system 208. In one illustrative example, the set of recorders 220 can send results 228 as data is recorded, periodically, or after processing of the set of test cases 226 has completed.

In this illustrative example, representation manager 202 receives results 228 from the set of recorders 220. As depicted, representation manager 202 can store results 228 in central repository 230 for use in generating representation 206. In this illustrative example, central repository 230 may be one or more storage systems configured to store results 228. Thus, representation manager 202 can receive traffic 224 in results 228 from multiple recorders in recorders 220 stored in central repository 230.

In this illustrative example, representation manager 202 generates representation 206 of distributed data processing system 208 using results 228 from sending the set of tests cases 226 into distributed data processing system 208. As depicted, representation 206 of distributed data processing system 208 comprises elements 218 in distributed data processing system 208 and data flow 232 between elements 218.

For example, representation manager 202 can correlate information in the set of test cases 226 to traffic 224 and results 228. The flow of pieces of information in the set of test cases 226 can be analyzed to identify data flow 232 between elements 218 in distributed data processing system 208 to identify connections between elements 218 used to generate representation 206 of distributed data processing system 208. Further, representation 206 can also identify when information is transmitted in an encrypted or decrypted form between elements 218.

The different processes in representation manager 202 running on computer system 204 enables reducing at least one of time or resources used by representation manager 202 in computer system 204 to generate representation 206 of distributed data processing system 208. In this manner, computer system 204 with representation manager 202 is transformed into an improved computer system in which representation 206 can be generated more quickly as compared to current computer systems, with less resource use of both. This process can be repeated periodically in response to an event or request to update and maintain representation 206 of distributed data processing system 208.

Representation manager 202 may be implemented in software, hardware, firmware or a combination thereof. When software is used, the operations performed by representation manager 202 may be implemented in program code configured to run on hardware, such as a processor unit. When firmware is used, the operations performed by representation manager 202 may be implemented in program code and data and stored in persistent memory to run on a processor unit. When hardware is employed, the hardware may include circuits that operate to perform the operations in representation manager 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 204 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with efficiently creating and managing a diagram for a distributed data processing system. As a result, one or more technical solutions may provide a technical effect of generating a representation of a distributed data processing system. This representation can be displayed on a display system as a diagram to a user to enable the user to visualize a distributed data processing system. One or more technical solutions employ steps that are different from those currently used to create diagrams of distributed data processing systems, enabling a reduction in at least one of time or resources needed to create a diagram of the distributed data processing system.

As a result, computer system 204 operates as a special purpose computer system in which representation manager 202 in computer system 204 enables at least one of creating or updating representation 206 of distributed data processing system 208. In particular, representation manager 202 transforms computer system 204 into a special purpose computer system as compared to currently available general computer systems that do not have representation manager 202.

Figure 3:
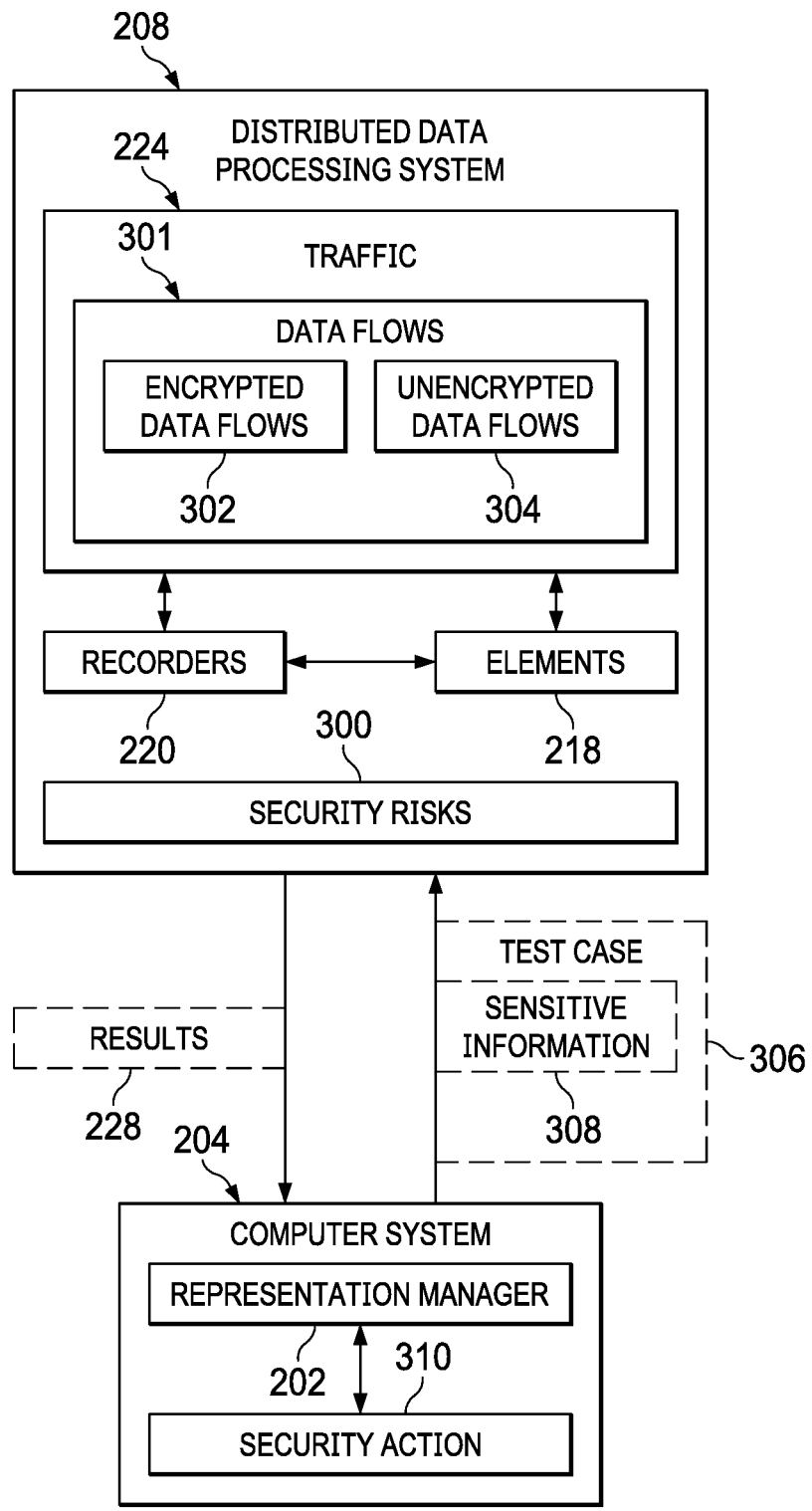
FIG. 3 is a block diagram illustrating an identification of security risks in a distributed data processing system in accordance with an illustrative embodiment.

With reference next to FIG. 3, a block diagram illustrating an identification of security risks in a distributed data processing system is depicted in accordance with an illustrative embodiment. In the illustrative examples, the same reference numeral may be used in more than one figure. This reuse of a reference numeral in different figures represents the same element in the different figures.

As depicted, representation manager 202 operates to identify a set of security risks 300 in distributed data processing system 208. A set of recorders 220 monitors traffic 224 for the set of elements 218 instrumented by the set of recorders 220. Traffic 224 for elements 218 include data flows 301. In this particular example, data flows 301 include at least one of encrypted data flows 302 or unencrypted data flows 304 between elements 218. Representation manager 202 is configured to identify encrypted data flows 302 and unencrypted data flows 304 between elements 218. These types of data flows 301 can be identified from examining traffic 224 in results 228 received from the set of recorders 220.

With this information, representation manager 202 can identify a set of security risks 300 for distributed data processing system 208. For example, test case 306 in the set of test cases 226 in FIG. 2 includes sensitive information 308. Sensitive information 308 is information that should not be freely distributed. Sensitive information 308 can be considered confidential to a particular person, organization, or other entity. Sensitive information 308 can be selected from at least one of a date of birth, a social security number, a home address, marketing information, a customer list, a product design, encryption key, or other information that should be maintained securely.

The flow of sensitive information 308 can be identified in encrypted data flows 302 and unencrypted data flows 304. A security risk may be present if sensitive information 308 is sent in an unencrypted data flow between two of elements 218. For example, sending sensitive information 308 in an unencrypted form from a server to a storage device in which sensitive information 308 is stored in the unencrypted form poses a security risk. As another illustrative example, sending sensitive information 308 in an unencrypted data flow out the distributed data processing system 208 to a remote computer system is also considered a security risk in this particular example.

In the illustrative example, representation manager 202 performs security action 310 in response to identifying a set of security risks 300. Security action 310 may take a number of different forms. For example, representation manager 202 may send a message, generate an alert, graphically indicate the presence of the set of security risks 300 on diagram 210, shut down elements 218 creating the security risk, and other suitable actions with respect to the set of security risks 300.

Figure 4:
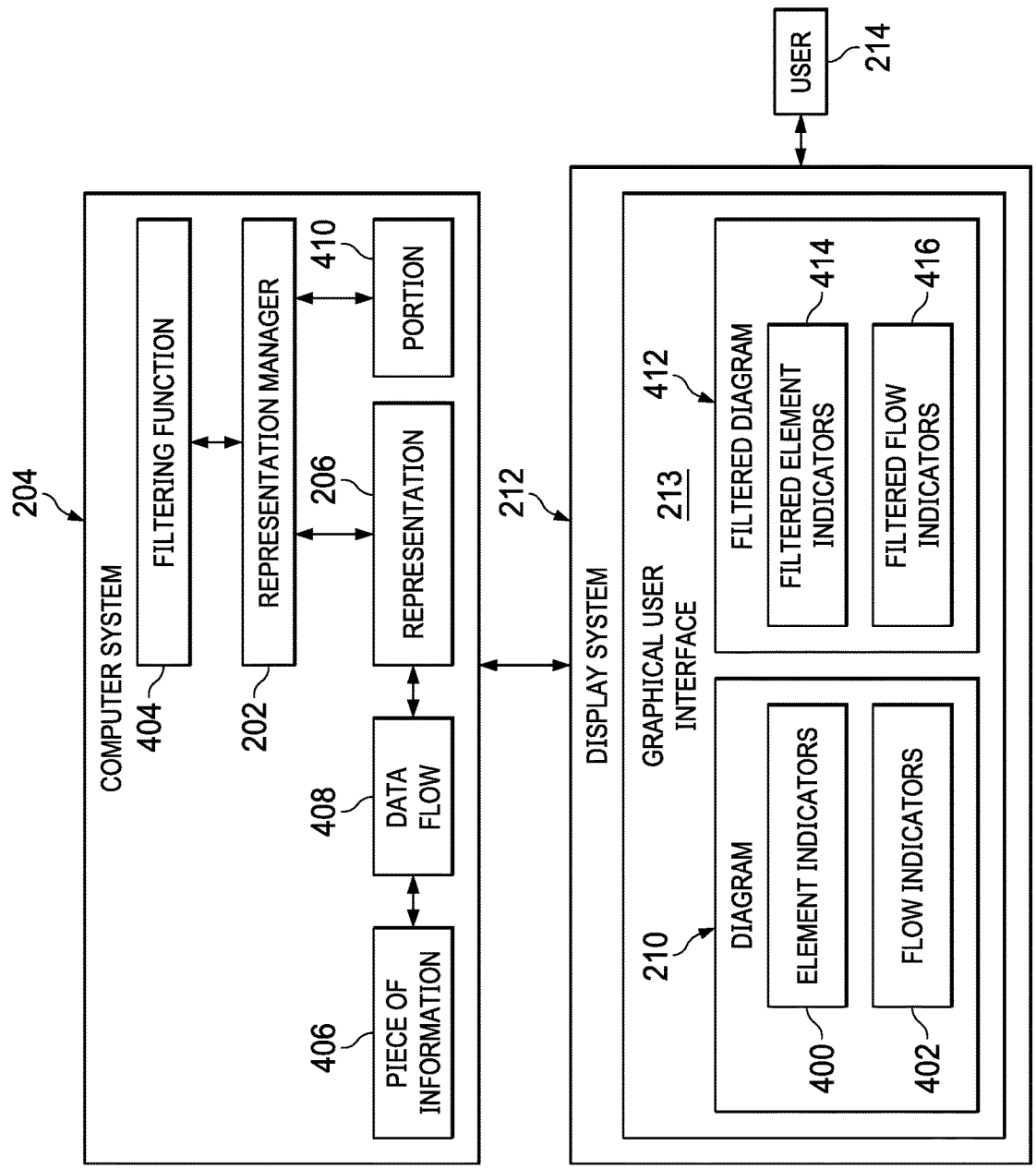
FIG. 4 is a block diagram illustrating filtering a representation of a distributed data processing system in accordance with an illustrative embodiment.

Turning to FIG. 4, a block diagram illustrating filtering a representation of a distributed data processing system is depicted in accordance with an illustrative embodiment. In this illustrative example, representation manager 202 displays diagram 210 in graphical user interface 213 on display system 212 to user 214 as a visual representation of distributed data processing system 208. As depicted, diagram 210 includes element indicators 400 for elements 218 identified from results 228 in FIG. 2. Element indicators 400 are graphical indicators that visually depict elements 218. Diagram 210 also includes flow indicators 402, which are graphical indicators that indicate the flow of traffic 224 between elements 218.

In this illustrative example, user 214 uses filtering function 404 to view a portion of distributed data processing system 208. For example, user 214 may desire to see a portion of elements 218 with respect to how piece of information 406 flows within distributed data processing system 208. Piece of information 406 may have been previously introduced in set of test cases 226 in FIG. 2. In this manner, the set of test cases 226 can be used to filter traffic 224 received in results 228 from the set of recorders 220 in FIGS. 2-3.

By selecting filtering based on piece of information 406, representation manager 202 uses filtering function 404 to identify data flow 408 for piece of information 406 within representation 206 for distributed data processing system 208. Filtering function 404 is used by representation manager 202 to identify portion 410 of elements 218 through which piece of information 406 flows within distributed data processing system 208. Representation manager 202 displays filtered diagram 412 using portion 410 of elements 218 identified in representation 206 and data flow 408 to display filtered element indicators 414 and filtered flow indicators 416 in filtered diagram 412 in graphical user interface 213.

With filtering function 404, representation manager 202 is able to change the display of diagram 210 in a manner that allows user 214 to visualize subsets of at least one of elements 218 or data flows through one within distributed data processing system 208. For example, user 214 may be able input piece of information 406 to see whether piece of information 406 flows through unencrypted data flows 304 in FIG. 3 visualized through filtered flow indicators 416 in filtered diagram 412.

The illustration of diagramming environment 200 and the different components in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, security risks 300 may be based on other factors other than whether a data flow is encrypted. For example, the level of encryption for encrypted data flows may be examined to determine whether sufficient security is present based on a policy containing a set of rules defining what is considered sufficient encryption. In yet another illustrative example, whether information is sent outside of distributed data processing system 208 may be used to determine whether a security risk is present. In still other illustrative examples, security risks 300 may be based on information received. For example, security risks 300 may examine traffic flow to determine whether a risk for potential viruses, trojan horses, worms, or other malware may be present from external sources. For example, external sources may be identified from traffic 224 in results 228. This identification can be used to determine whether security risks 300 are present.

Further, central repository 230 may be distributed in different locations. In another illustrative example, piece of information 406 may be sent in a new test case through distributed data processing system 208 with new results which can be received and processed to generate filtered diagram 412.

Figure 5:
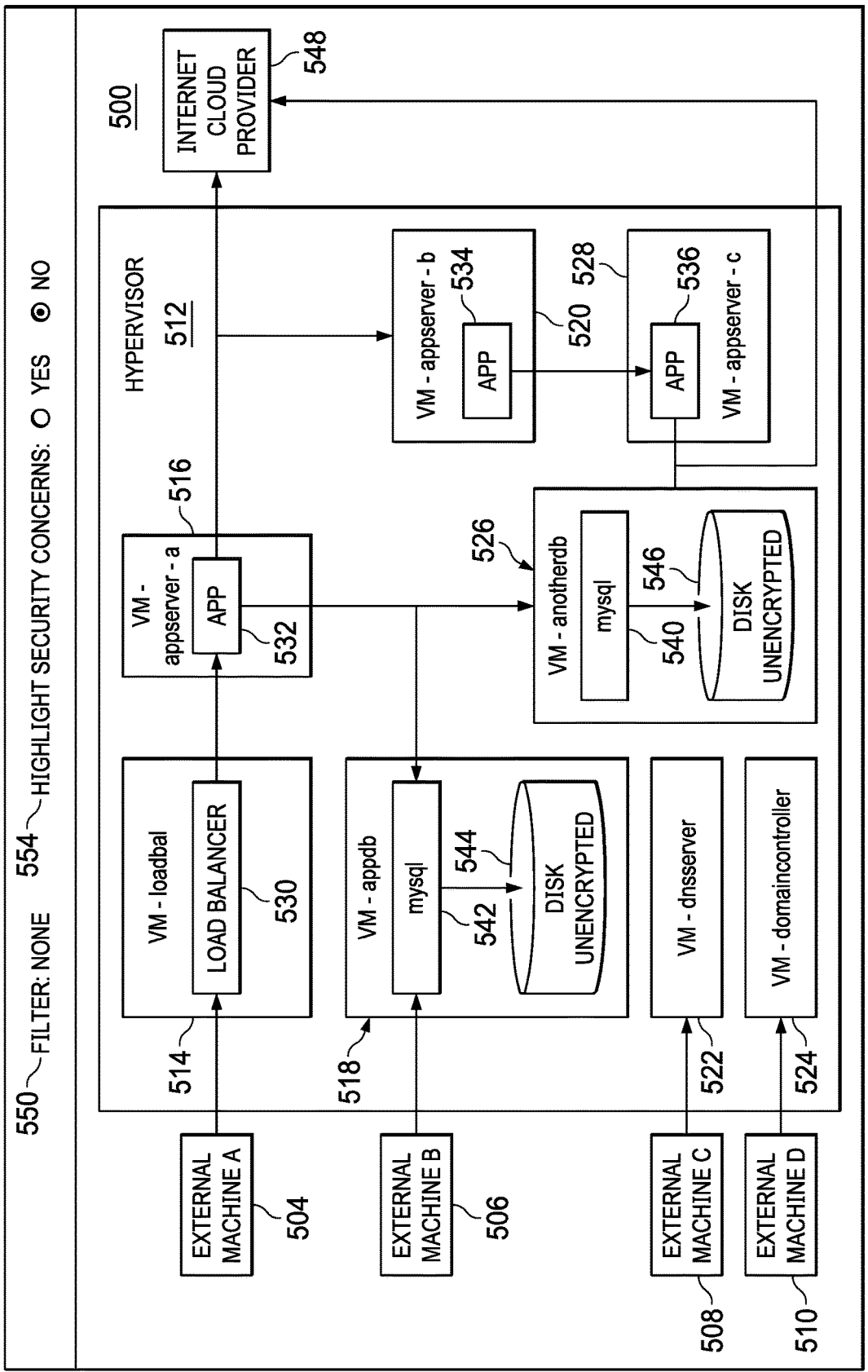
FIG. 5 is a diagram of a distributed data processing system in accordance with an illustrative embodiment.

With reference next to FIG. 5, a diagram of a distributed data processing system is depicted in accordance with an illustrative embodiment. Diagram 500 is an example of one implementation of diagram 210 shown in block form in FIG. 2 and FIG. 4.

As depicted in this illustrative example, diagram 500 is displayed in graphical user interface 502. In this illustrative example, diagram 500 shows elements and data flows in a distributed data processing system using element indicators and flow indicators. These elements included in the distributed data processing system include hypervisor 512, virtual machine 514, virtual machine 516, virtual machine 518, virtual machine 520, virtual machine 522, virtual machine 524, virtual machine 526, virtual machine 528, load balancer 530, application 532, application 534, application 536, database management system 540, database management system 542, unencrypted disk 544, and unencrypted disk 546. Other elements outside of the attributed data processing system comprise external machine A 504, external machine B 506, external machine C 508, external machine D 510, and Internet cloud provider 548.

In this illustrative example, the information about elements and data flow within hypervisor 512 is identified by instrumenting hypervisor 512. As depicted, filter 550 is "none" while highlight security concerns 554 has a "no" option selected. As depicted, diagram 500 provides a user an ability to understand how the different elements interact with each other.

Figure 6:
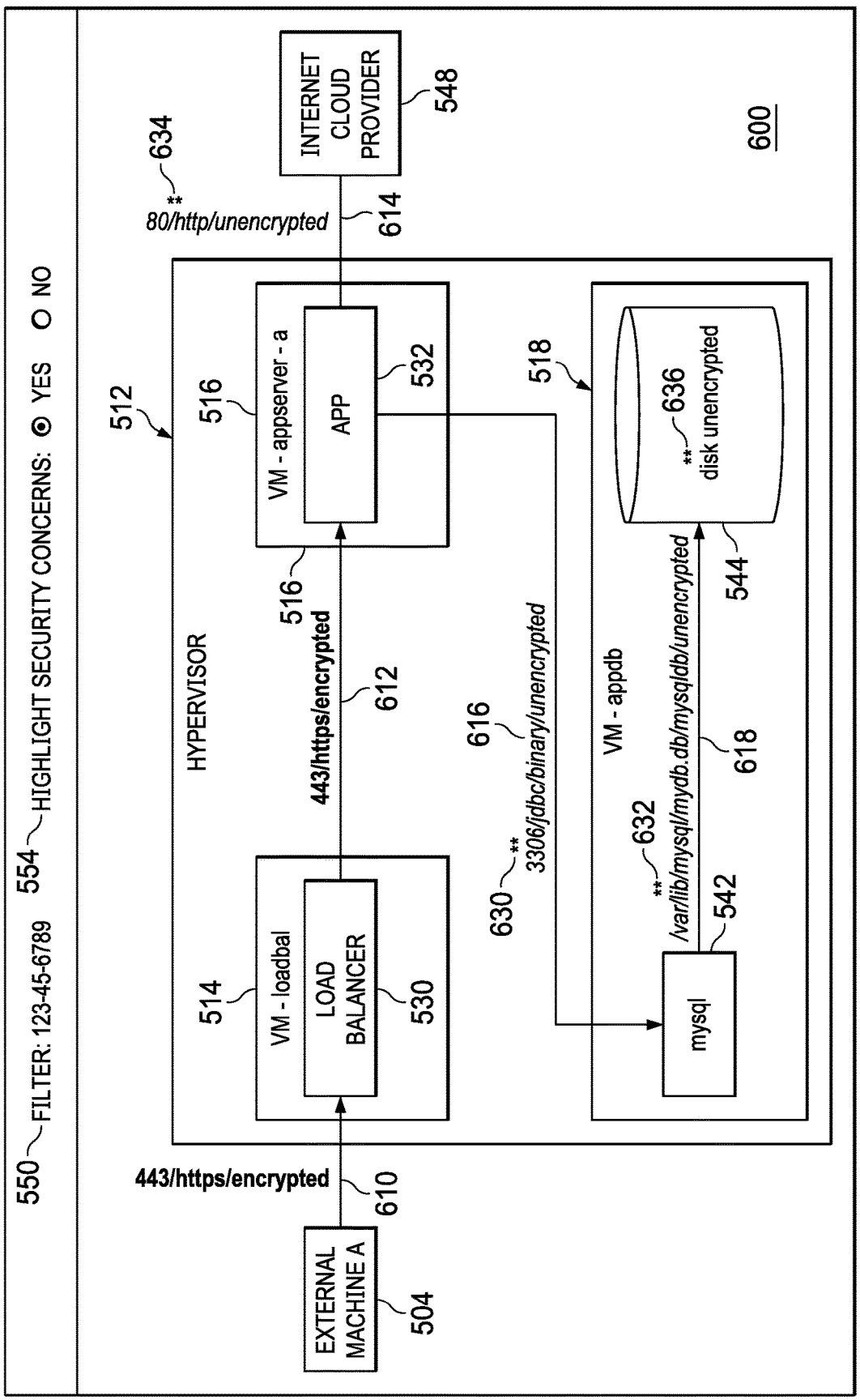
FIG. 6 is a filtered diagram of a distributed data processing system in accordance with an illustrative embodiment.

Turning to FIG. 6, a filtered diagram of a distributed data processing system is depicted in accordance with an illustrative embodiment. In this illustrative example, filtered diagram 600 is an example of one implementation for filtered diagram 412 shown in block form in FIG. 4. In this example, filtered diagram 600 is depicted within graphical user interface 502. Filtered diagram 600 is generated in response to filter 550 having a value of "123-45-6789," and highlight security concerns 552 has the option "yes" selected.

As depicted, the Social Security number "123-45-6789" is an example of piece of information 406 shown in block form in FIG. 4. In this depicted example, this piece of information is a social security number that has been sent through the distributed data processing system, hypervisor 512, in a test case. The selections result in filtered diagram 600 being displayed in graphical user interface 502 in place of diagram 500.

As depicted, filtered diagram 600 illustrates components for which traffic contains "123-45-6789." In this example, traffic is shown for load balancer 530 within virtual machine 514, application 532 within virtual machine 516, database management system 542 within virtual machine 518, and unencrypted disk 544 within virtual machine 518. External machine A 504 is shown as having sent the piece of information to load balancer 530. Internet cloud provider 548 is shown in this diagram as having received the piece of information from application 532.

Further, filtered diagram 600 depicts encrypted data flows and unencrypted data flows that carry the social security number. In this illustrative example, encrypted flow indicator 610 and encrypted flow indicator 612 graphically indicate encrypted data flows. Unencrypted flow indicator 614, unencrypted flow indicator 616, and unencrypted flow indicator 618 show unencrypted data flows.

In this illustrative example, security concern indicator 630, security concern indicator 632, security concern indicator 634, and security concern indicator 636 are graphical indicators indicating that a security concern is present for particular data flows for elements in the distributed data processing system. As depicted, security concern indicator 636 is a graphical indicator indicating a security concern for an element, unencrypted disk 544, in which "123-45-6789" is stored in virtual machine 518.

In this example, the security concern indicators are in the form of an "*" and bolding. In other illustrative examples, other graphical indicators may be used in addition to or in place of the "*" to show security concerns. For example, color, animation, images, text, or other types of graphical indicators may be used.

As depicted in this example, security concerns are present in respect to the flow of unencrypted flow indicator 614 to Internet cloud provider 548. Additionally, security concerns are present for unencrypted data flows to database management system 542 which manages a database in unencrypted disk 544.

Figure 7:
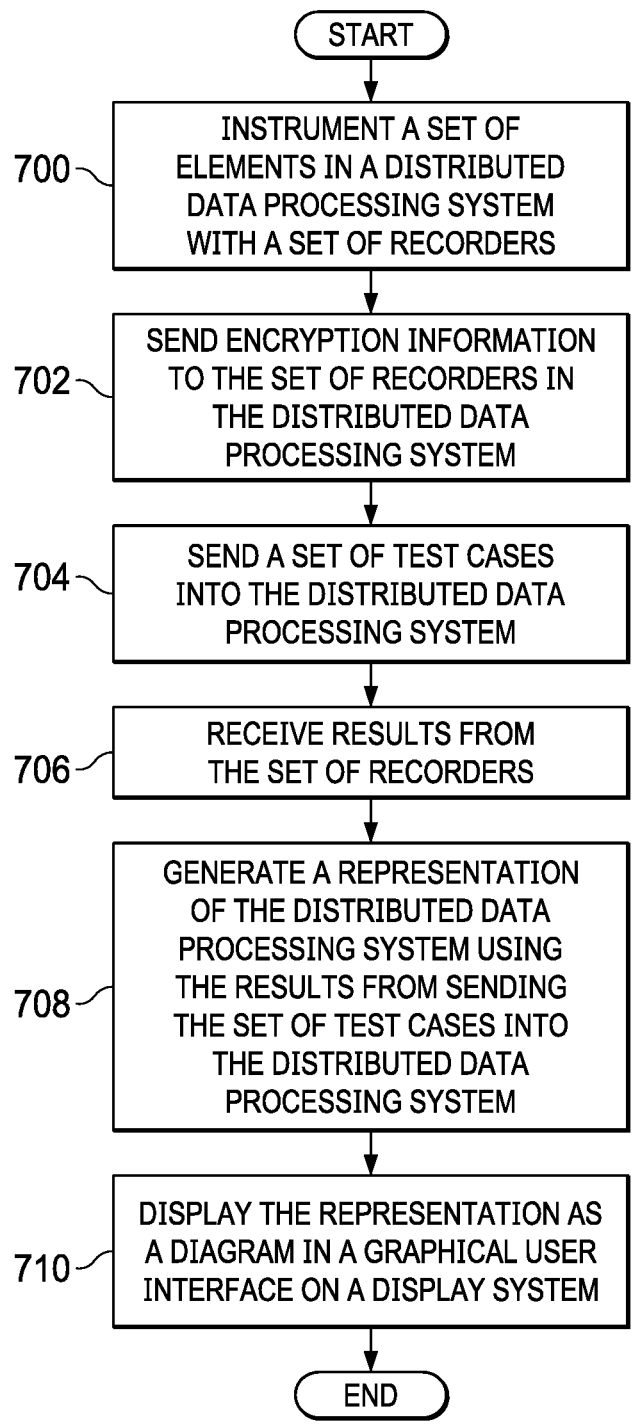
FIG. 7 is a flowchart of a process for generating a representation of a distributed data processing system in accordance with an illustrative embodiment.

Turning next to FIG. 7, a flowchart of a process for generating a representation of a distributed data processing system is depicted in accordance with an illustrative embodiment. The process in this flowchart can be implemented in representation manager 202 running on computer system 204 shown in block form in FIGS. 2-3. The process illustrated in this flowchart can be implemented in at least one of software or hardware. When software is used, program code with instructions are run on one or more processor units in computer system 204 to perform the different steps illustrated for the process in this flowchart.

The process begins by instrumenting a set of elements in a distributed data processing system with a set of recorders (step 700). The process sends encryption information to the set of recorders in the distributed data processing system (step 702). The set of recorders use the encryption information to decrypt traffic in the distributed data processing system.

The process sends a set of test cases into the distributed data processing system (step 704). The recorders record the results from sending the set of test cases into the distributed processing system. These results are results of monitoring the set elements instrumented and can include traffic going into and out of the set of elements.

The process receives results from the set of recorders (step 706). The process generates a representation of the distributed data processing system using the results from sending the set of tests cases into the distributed data processing system (step 708). The process displays the representation as a diagram in a graphical user interface on a display system (step 710). The process terminates thereafter. The process in FIG. 7 enables reducing a time for the computer system to generate the representation of the distributed data processing system. In step 710, the process can display the diagram of the representation with a number of annotations in the diagram, wherein the number of annotations identifies a number of the elements causing a security risk.

Figure 8:
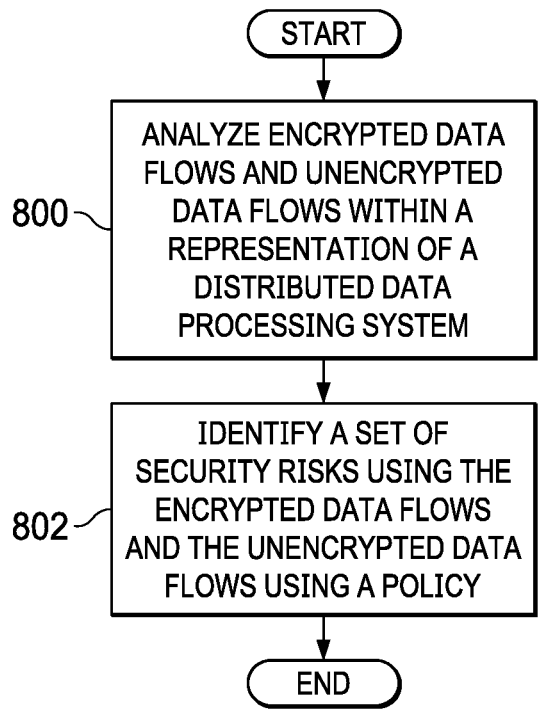
FIG. 8 is a flowchart of a process for managing security risks identified in a distributed data processing system in accordance with an illustrative embodiment.

With reference next to FIG. 8, a flowchart of a process for managing security risks identified in a distributed data processing system is depicted in accordance with an illustrative embodiment. The process in this flowchart can be implemented in representation manager 202 running on computer system 204 shown in block form in FIG. 2-3. The process illustrated in this flowchart can be implemented in at least one of software or hardware. When software is used, program code with instructions are run on one or more processor units in computer system 204 to perform the different steps illustrated for the process in this flowchart.

The process begins by analyzing encrypted data flows and unencrypted data flows within a representation of a distributed data processing system (step 800). The process identifies a set of security risks using the encrypted data flows and the unencrypted data flows using a policy (step 802). The process terminates thereafter. In this illustrative example, the policy is one or more rules that are applied to different data flows to determine whether one or more security risks are present. These rules may specify that a security risk is present when at least one of an unencrypted data flow of sensitive information occurs, a level of encryption is considered to be sufficient, or other types of rules for indicating when a security risk is present.

Figure 9:
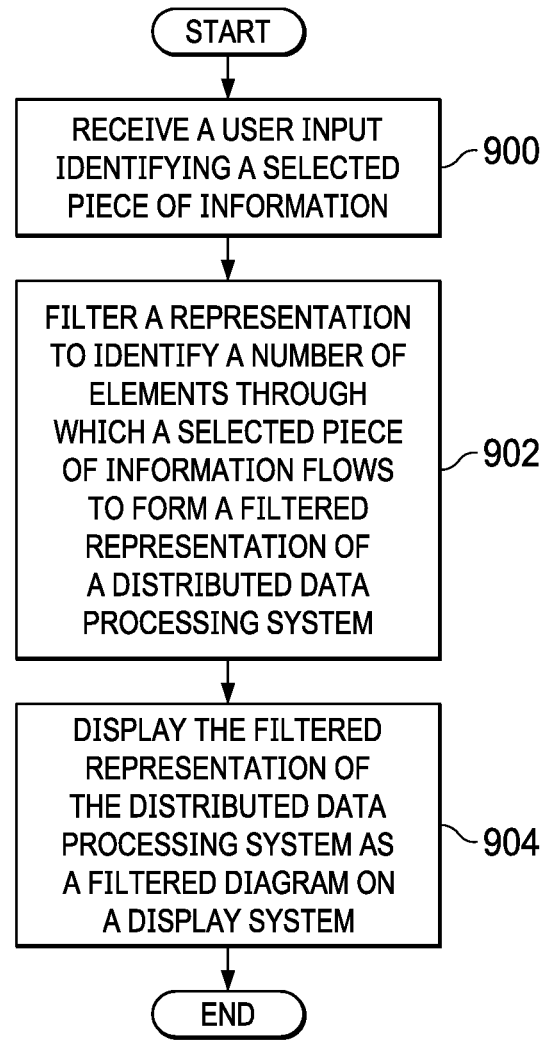
FIG. 9 is a flowchart of a process for managing security risks identified in a distributed data processing system in accordance with an illustrative embodiment.

With reference next to FIG. 9, a flowchart of a process for managing security risks identified in a distributed data processing system is depicted in accordance with an illustrative embodiment. The process in this flowchart can be implemented in representation manager 202 running on computer system 204 shown in block form in FIG. 2-3. The process illustrated in this flowchart can be implemented in at least one of software or hardware. When software is used, program code with instructions are run on one or more processor units in computer system 204 to perform the different steps illustrated for the process in this flowchart.

The process begins by receiving a user input identifying a selected piece of information (step 900). The process filters a representation to identify a number of elements through which a selected piece of information flows to form a filtered representation of a distributed data processing system (step 902). The process displays the filtered representation of the distributed data processing system as a filtered diagram on a display system (step 904). The process terminates thereafter. In step 904, the display can contain annotations of elements that caused the security risk. For example, an element sending an unencrypted message can be highlighted to indicate that the element created a security risk. In another example, another graphical indicator such as animation, an icon, text, or some other type of graph indicator may be used to indicate that the elements created a security risk. In this manner, the process displays a diagram of the representation of the distributed data processing system, wherein the diagram includes annotations identifying elements causing the security risk.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
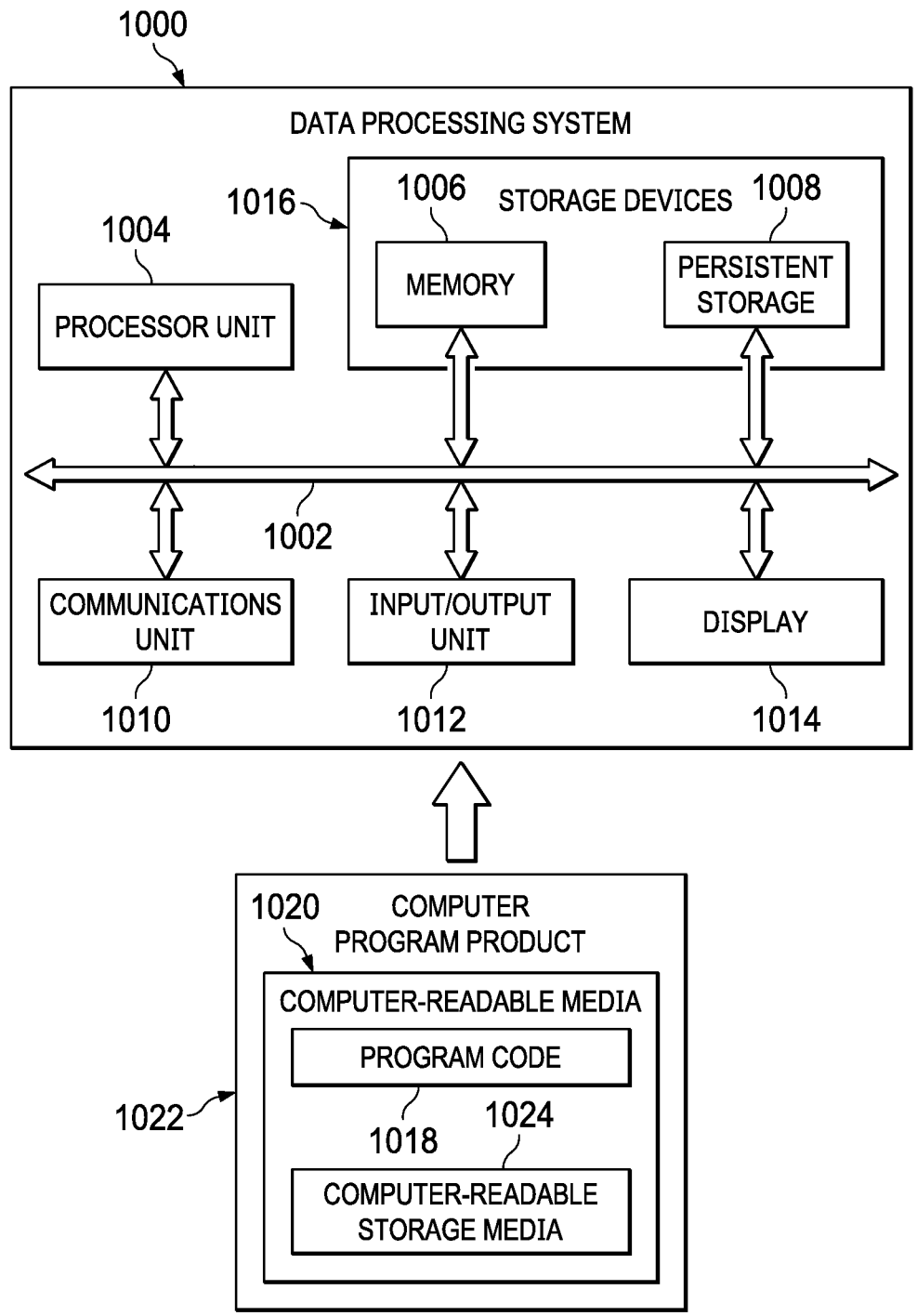
FIG. 10 is a block diagram of a data processing system in accordance with an illustrative embodiment.

Turning now to FIG. 10, a block diagram of a data processing system is depicted in accordance with an illustrative embodiment. Data processing system 1000 may be used to implement server computer 104, server computer 106, client devices 110, and computer system 204. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a solid-state drive (SSD), a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 may be transferred to data processing system 1000 using a computer-readable signal media. The computer-readable signal media may be, for example, a propagated data signal containing program code 1018. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

Thus, illustrative embodiments of the present invention provide a computer-implemented method, a computer system, and a computer program product for generating a representation of a distributed data processing system. In one illustrative example, a set of elements in the distributed data processing system is instrumented with a set of recorders. Encryption information is sent to the set of recorders in the distributed data processing system. The set of recorders use the encryption information to decrypt traffic in the distributed data processing system. A set of test cases is sent into the distributed data processing system. A representation of the distributed data processing system is generated using results from sending the set of test cases into the distributed data processing system. The process enables reducing a time for the computer system to generate the representation of the distributed data processing system.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for generating a representation of a distributed data processing system, the method comprising:
    instrumenting, by a computer system, a set of elements in the distributed data processing system with a set of recorders;
    sending, by the computer system, encryption information to the set of recorders in the distributed data processing system, wherein the set of recorders uses the encryption information sent to the set of recorders to decrypt traffic in the distributed data processing system;
    sending, by the computer system, a set of test cases into the distributed data processing system; and
    generating, by the computer system, the representation of the distributed data processing system using results from sending the set of test cases into the distributed data processing system, reducing a time for the computer system to generate the representation of the distributed data processing system.

2. The method of claim 1 further comprising:
    displaying, by the computer system, the representation as a diagram on a display system.

3. The method of claim 1 further comprising:
    receiving, by the computer system, the results from the set of recorders, wherein the set of recorders records the results from sending the set of test cases into the distributed data processing system.

17

4. The method of claim 1, wherein the representation of the distributed data processing system includes encrypted data flows and unencrypted data flows between elements in the distributed data processing system.

5. The method of claim 4 further comprising:
identifying, by the computer system, a set of security risks using the encrypted data flows and the unencrypted data flows in the distributed data processing system; and
performing, by the computer system, a security action in response to identifying the set of security risks.

6. The method of claim 1 further comprising:
filtering, by the computer system, the representation to identify a number of elements through which a selected piece of information flows to form a filtered representation of the distributed data processing system, wherein the selected piece of information is selected from the set of test cases; and
displaying, by the computer system, the filtered representation of the distributed data processing system as a filtered diagram on a display system.

7. The method of claim 1, wherein the representation of the distributed data processing system comprises the set of elements in the distributed data processing system and data flow between the set of elements.

8. The method of claim 2, wherein the displaying step comprises:
displaying, by the computer system, the diagram of the representation with a number of annotations in the diagram, wherein the number of annotations identifies a number of elements causing a security risk.

9. The method of claim 1, wherein the set of elements is selected from at least one of a hypervisor, a virtual machine, an operating system kernel, or an application.

10. A diagramming system comprising:
a computer system; and
a representation manager running on the computer system, wherein the representation manager instruments a set of elements in a distributed data processing system with a set of recorders; sends encryption information to the set of recorders in the distributed data processing system, wherein the set of recorders uses the encryption information sent to the set of recorders to decrypt traffic in the distributed data processing system; sends a set of test cases into the distributed data processing system; and generates a representation of the distributed data processing system using results from sending the set of test cases into the distributed data processing system, reducing a time for the computer system to generate the representation of the distributed data processing system.

11. The diagramming system of claim 10, wherein the representation manager receives the results from the set of recorders, wherein the set of recorders records the results from sending the set of test cases into the distributed data processing system.

12. The diagramming system of claim 10, wherein the representation of the distributed data processing system includes encrypted data flows and unencrypted data flows in the distributed data processing system, and wherein the representation manager identifies a set of security risks using the encrypted data flows and the unencrypted data flows in the distributed data processing system, and performs a security action in response to identifying the set of security risks.

13. The diagramming system of claim 10, wherein the representation manager filters the representation to identify a number of elements through which a selected piece of information flows to form a filtered representation of the distributed data processing system, and wherein the selected piece of information is selected from the set of test cases and displays the filtered representation of the distributed data processing system as a filtered diagram on a display system.

14. The diagramming system of claim 10, wherein the representation of the distributed data processing system comprises elements in the distributed data processing system and data flow between the elements.

15. The diagramming system of claim 10, wherein the representation manager displays a diagram of the representation with a number of annotations in the diagram, wherein the number of annotations identifies a number of elements causing a security risk.

16. The diagramming system of claim 10, wherein the set of elements is selected from at least one of a hypervisor, a virtual machine, an operating system kernel, and an application.

17. A non-transitory computer readable storage medium having stored thereon instructions that, when executed by a computing device, cause the computing device to perform operations comprising:
instrumenting a set of elements in the distributed data processing system with a set of recorders;
sending encryption information to the set of recorders in the distributed data processing system, wherein the set of recorders uses the encryption information sent to the set of recorders to decrypt traffic in the distributed data processing system;
sending a set of test cases into the distributed data processing system; and
generating the representation of the distributed data processing system using results from sending the set of test cases into the distributed data processing system, reducing a time for a computer system to generate the representation of the distributed data processing system.

18. The non-transitory computer readable storage medium of claim 17, wherein the instructions, when executed by the computing device, cause the computing device to perform a further operation comprising:
receiving the results from the set of recorders, wherein the set of recorders records the results from sending the set of test cases into the distributed data processing system.

19. The non-transitory computer readable storage medium of claim 17, wherein the representation of the distributed data processing system includes encrypted data flows and unencrypted data flows between elements in the distributed data processing system and wherein the instructions, when executed by the computing device, cause the computing device to perform further operations comprising:
identifying a set of security risks using the encrypted data flows and the unencrypted data flows in the distributed data processing system; and
performing a security action in response to identifying the set of security risks.

20. The non-transitory computer readable storage medium of claim 17, wherein the instructions, when executed by the computing device, cause the computing device to perform further operations comprising:
filtering the representation to identifying a number of elements through which a selected piece of information flows to form a filtered representation of the distributed data processing system, wherein the selected piece of information is selected from the set of test cases; and displaying the filtered representation of the distributed data processing system on a display system.

\* \* \* \* \*